INVENTOR.
RICHARD F. WOODCOCK

ATTORNEY

June 29, 1971 R. F. WOODCOCK 3,590,004
LASER MATERIAL COMPRISED OF ERBIUM AND YTTERBIUM DOPED GLASS
CORE AND NEODYMIUM DOPED GLASS SENSITIZER ELEMENT
Filed Aug. 8, 1968 2 Sheets-Sheet 2

INVENTOR.
RICHARD F. WOODCOCK

BY
ATTORNEY

United States Patent Office 3,590,004
Patented June 29, 1971

3,590,004
LASER MATERIAL COMPRISED OF ERBIUM AND YTTERBIUM DOPED GLASS CORE AND NEODYMIUM DOPED GLASS SENSITIZER ELEMENT
Richard F. Woodcock, South Woodstock, Conn., assignor to American Optical Corporation, Southbridge, Mass.
Filed Aug. 8, 1968, Ser. No. 751,120
Int. Cl. C09k *1/04*
U.S. Cl. 252—301.4        6 Claims

ABSTRACT OF THE DISCLOSURE

A laser material consisting of a glass rod composed of two differently doped glasses, one glass comprises a laserable core and a second glass comprises a sensitizer element. The glass which comprises a laserable core contains erbium as the laserable ion and also includes ytterbium oxide as a sensitizer. The glass which comprises the sensitizer element contains neodymium oxide and ytterbium oxide which act solely as sensitizer ions. When the glass rod is pumped with optical energy, a large amount of energy is absorbed by the neodymium and ytterbium ions in the sensitizer element, which energy is transmitted into the laserable core by both radiative and non-radiative processes to assist in producing a state of population inversion in the erbium ions present within the core.

BACKGROUND OF THE INVENTION

The field of this invention is laser materials. Prior art laserable materials containing trivalent erbium as the active laser ion have been increased in efficiency by the inclusion within the host material of sensitizer ions to assist in pumping the trivalent erbium ions from the ground state to an excited level. An energy transfer scheme taught in U.S. patent application Ser. No. 420,270, filed Dec. 22, 1964, and assigned to the assignee of the present application, employs trivalent ytterbium as a sensitizer for trivalent erbium. However, trivalent ytterbium does not absorb all of the wavelengths emitted by conventional xenon flash tubes. In fact, ytterbium absorbs only a small portion of the total amount of light produced by such a flash tube. In order to increase absorption and hence the pumping efficiency, U.S. patent application Ser. No. 420,270 teaches that trivalent neodymium can be included as a sensitizer ion for ytterbium. Unlike ytterbium, neodymium has absorption bands in the visible portion of the spectrum and is, therefore, able to absorb the light energy emitted by the flash tube in this portion of the spectrum. However, in that arrangement, the neodymium ions which are added to act as sensitizers and thus absorb more of the light from the pump source, also tend to quench the erbium ions even at low neodymium ion concentrations. However, by separating the neodymium ions from the erbium ions, by placing the neodymium ions in a sensitizer element surrounding or within a laserable core containing the erbium ions, the problem of erbium being quenched by neodymium is eliminated, since the neodymium and erbium ions are no longer near neighbors. However, energy absorbed by the neodymium ions can still be transferred to the ytterbium and erbium ions.

SUMMARY OF THE INVENTION

A laser material consisting of a rod comprised of two glasses, one a laserable core doped with ytterbium and erbium ions and a second sensitizer element doped with neodymium and ytterbium ions. The sensitizer element is disposed within or surrounds the laserable core. Light originating from a pump source, such as a flash tube, is absorbed by the neodymium ions and the ytterbium ions in the sensitizer element and is transferred to the ytterbium and erbium ions within the laserable core to assist in producing an inversion in the erbium ions within the laserable core.

It is an object of this invention to provide an efficient erbium laser material employing neodymium as a sensitizer but at the same time to eliminate quenching of the erbium ions by the neodymium ions.

DESCRIPTION OF THE PREFERRED EMBODIMENTS

Lasers are light-amplifying, light-producing devices and are specifically adapted to provide an output of high intensity, coherent, monochromatic light. Such light is produced by photonic emission from the active ions disposed within the body or core of a laser material. The ions which are normally at a positive temperature condition absorb quanta of light from an energy source such as a flash lamp. The ions are thus excited to a higher energy level and a "negative temperature" state of population inversion from which they rapidly relax to a more stable intermediate level. From the more stable intermediate level, the ions then make a transition normally at a slower rate to the original level or ground state with an attendant emission of light. The emission by transition from the intermediate level to the ground state is fluorescent. In a laser oscillator, an intense output in a narrow cone is provided by the structure of the laser device which is in a cavity, one end of which is totally reflective, the other end of which is slightly transmissive. In this invention erbium is selected as the laserable ion and is present within the laserable core of the host rod, said host rod being essentially transparent to light energy at the laser-emissive wavelength of erbium.

Figure 1:
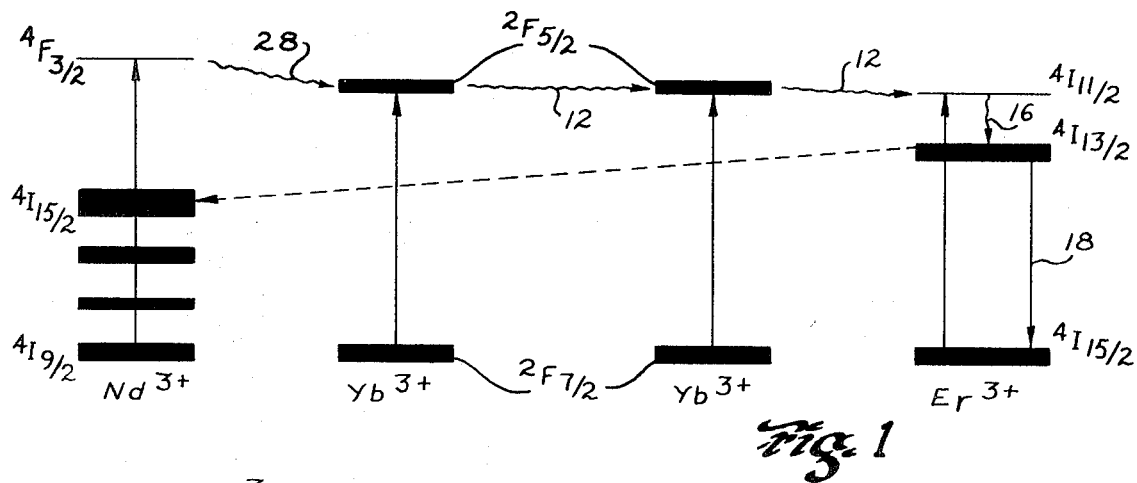
FIG. 1 is an energy level diagram showing energy transfer from neodymium and ytterbium ions to erbium ions.

Referring to the drawing, FIG. 1 shows the energy transfer taught in U.S. patent application Ser. No. 420,270, filed Dec. 22, 1964, and assigned to the assignee of the instant application. In order to provide for more efficient laser action from the erbium ions, ytterbium ions are included in a host rod as sensitizers. Trivalent ytterbium can be pumped by an energy source from an initial ground level designated as $^2F_{7/2}$ to an upper level designated as $^2F_{5/2}$. An energy transfer indicated by wavy arrow 12 can then occur from the upper level of the trivalent ytterbium to the upper level $^4I_{11/2}$ of the trivalent erbium. A non-radiative transition then occurs from the $^4I_{11/2}$ level of the erbium to the $^4I_{13/2}$ level of the erbium. This transfer is represented by wavy arrow 16. Subsequent transitions occur between levels $^4I_{13/2}$ and $^4I_{15/2}$ producing laser output 18. However, as was explained earlier, ytterbium does not absorb all of the wavelengths of light energy produced by a flash tube. In order to increase absorption of the flash tube light, prior art materials have incorporated small amounts of neodymium in the ytterbium-erbium host. However, neodymium, even at relatively low concentrations, can quench the fluorescence of neighboring erbium ions. The problem of erbium's fluorescence being quenched by neodymium ions can be circumvented by providing a host material consisting of two glasses arranged in close proximity to each other, one of the glasses, a laserable core, being doped with the erbium ions and the other, a sensitizer element, being doped with the neodymium ions. Thus the neodymium and erbium ions are no longer near neighbors, except at the interface between the two glasses. By so providing, the neodymium will be unable to quench the fluorescence of the erbium.

Figure 2:
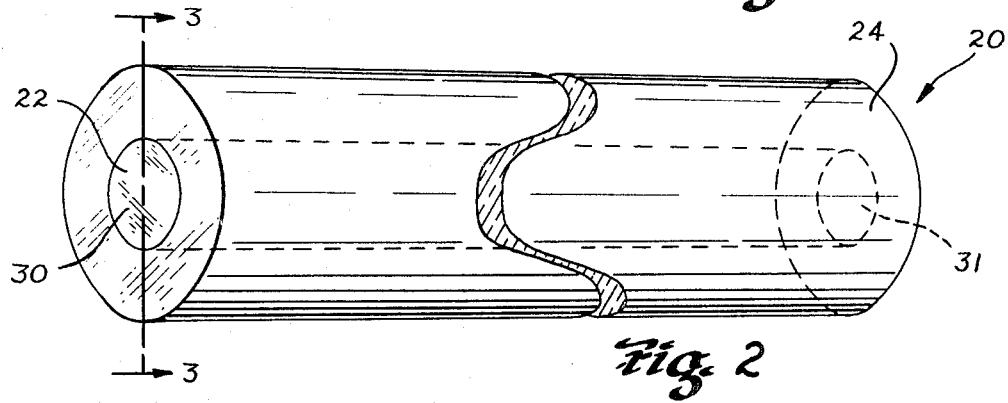
FIG. 2 is a perspective view showing one embodiment of the laser material of this invention.

FIG. 2 shows an embodiment of the laserable material of the present invention. Rod 20 is composed of laserable core 22 surrounded by cladding 24. In this embodiment cladding 24 serves as the sensitizer element. Homogeneously distributed throughout the mass of core 22 are erbium ions. Erbium is doped within said core in laserable quantities such that when a population inversion is established in the erbium ions, a radiative transition from a selected energy level of the erbium designated as $^4I_{13/2}$ to a lower level designated as $^4I_{15/2}$ is possible. Erbium is present in a concentration so that a sufficient inversion in population may be established between these two energy levels so as to provide enough gain in the laser wavelength of stimulated emission to overcome all light losses within laserable core 22. Experimentally it has been determined that the concentration of erbium ions necessary for laser action is between the range of $10^{18}$ ions per cubic centimeter and $3 \times 10^{21}$ ions per cubic centimeter. Expressed in a weight percent, this range would be approximately between the values of 0.01–30 weight percent of the oxide of $Er_2O_3$. Also homogeneously distributed throughout the mass of core 22 are ytterbium ions. The ytterbium ions are provided in a concentration sufficient to enable an energy transfer from the ytterbium to the erbium. The range for the concentration of ytterbium ions required for energy transfer to erbium ions is between the values of approximately 0.01–55 weight percent of the oxide, but the total $Er_2O_3$ and $Yb_2O_3$ content cannot exceed approximately 70 weight percent. It is to be understood that the base glass may be of any material previously used in the glass laser art and includes silicates, phosphates, borates, borosilicates, arsenic trisulfide, selenides, tellurides, fluorides, oxifluorides, alumino-silicates, germanates and organic glasses. The only controlling requirement for the base glass is that it be essentially transparent at the wavelength at which the active ions absorb and transmit energy. Cladding 24 may be composed of the same glass base as core 22; however, the invention is not intended to be limited to this specific arrangement. Included within and homogeneously distributed throughout the mass of cladding 24 are neodymium ions. In a preferred embodiment of the invention cladding 24 would contain 1 weight percent $Nd_2O_3$ for each 10% increase in the diameter of rod 20 over the diameter of core 22. Cladding 24 may also include ytterbium oxide within the range of 0.01–50 weight percent. However, good results can be obtained without any ytterbium oxide in the sensitizer element, but the inclusion of ytterbium oxide within said element increases the optical coupling from the neodymium within said element to the ytterbium and erbium within the laserable core.

Figure 3:
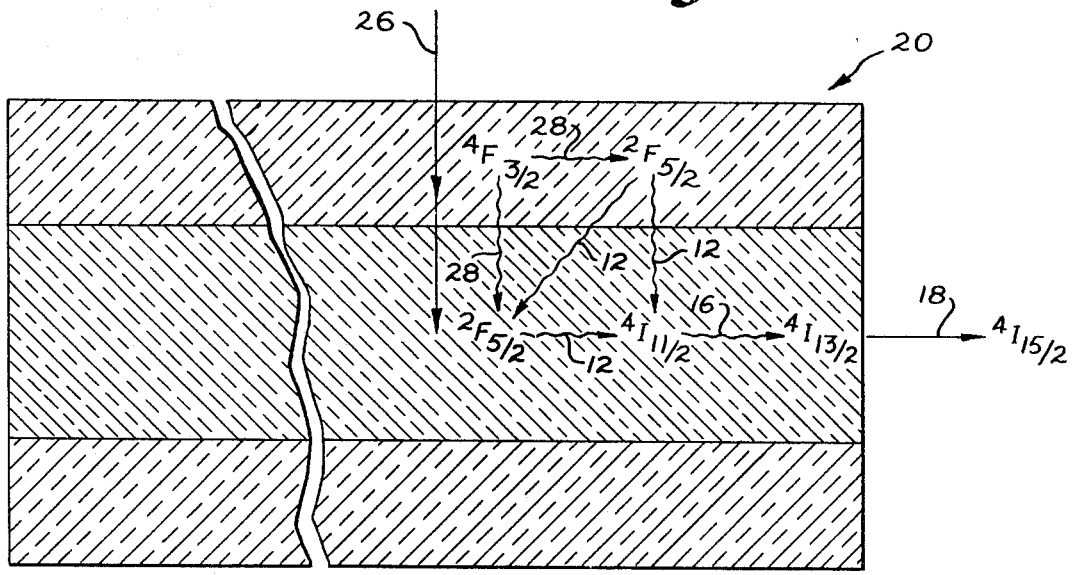
FIG. 3 is a sectional view taken along line 3—3 of FIG. 2 and diagrammatically showing the energy transfer of FIG. 1.

Operation of the laser material can be understood by reference to FIG. 3. Light from a flash tube (not shown), enters rod 20 as is indicated by arrow 26 and excites ions along its path. It is to be understood that the light from the flash lamp not only excites ions in cladding 24, but also passes through said cladding into core 22 and excites the active ions within said core. Neodymium ions within cladding 24 are excited by the flash tube to the $^4F_{3/2}$ level and transfer this energy to excite ytterbium ions both within cladding 24 and core 22 to the $^2F_{5/2}$ level, as is shown by wavy arrow 28. The ytterbium ions in cladding 24 and core 22 transfer energy to the $^4I_{11/2}$ level of the erbium to produce laser output as indicated by arrow 18 when a transition in the erbium ions takes place from the $^4I_{13/2}$ level to the $^4I_{15/2}$ level.

Figure 4:
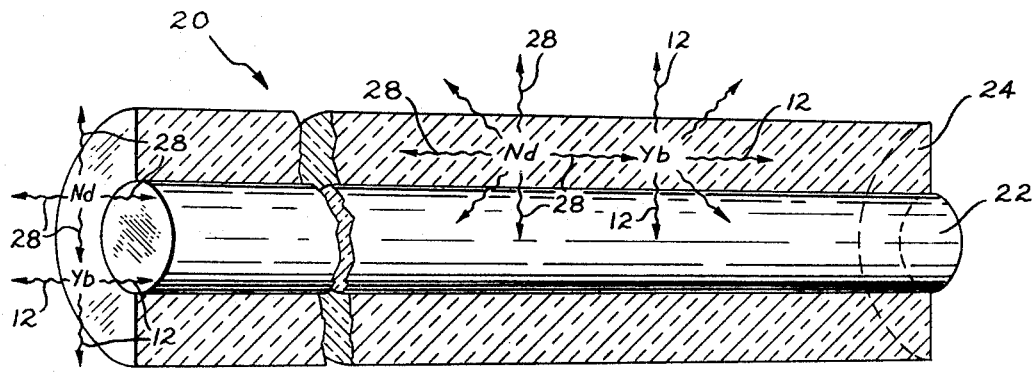
FIG. 4 is a perspective view partially in section of the laser material shown in FIG. 1.

FIG. 4 shows possible energy patterns of the $^4F_{3/2}$ level of the neodymium and the $^2F_{5/2}$ level of the ytterbium ions within cladding 24. As is shown by the arrows in FIG. 4, some of the energy is transferred in an inward direction and is absorbed by active ions within core 22, and some energy travels outward and is lost. Some of this lost energy can be reflected by the silver foil (not shown) used to couple flash tube light to the laser rod and can be recaptured. Also exterior of the cladding 24 can be provided with a ground finish, which can scatter light back into the rod.

Figure 5:
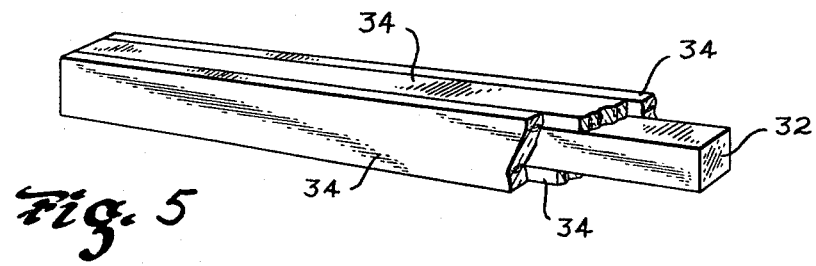
FIG. 5 is a perspective view partially in section showing a second embodiment of the laser material of this invention.

FIG. 5 shows an alternate embodiment of the invention. In this embodiment the laser material is comprised of a number of slabs of glass doped with active ions. In FIG. 5, slab 32 comprises the laserable core which core is doped with erbium and ytterbium ions and is surrounded by one or more slabs 34 which slabs comprise the sensitizer element, said sensitizer being doped with neodymium and ytterbium ions. An advantage of this embodiment is that the ratio of the size of the sensitizer element to the laserable core can be easily varied. Also the material shown in FIG. 5 is easily constructed, since the slabs need not be fused together.

Figure 6:
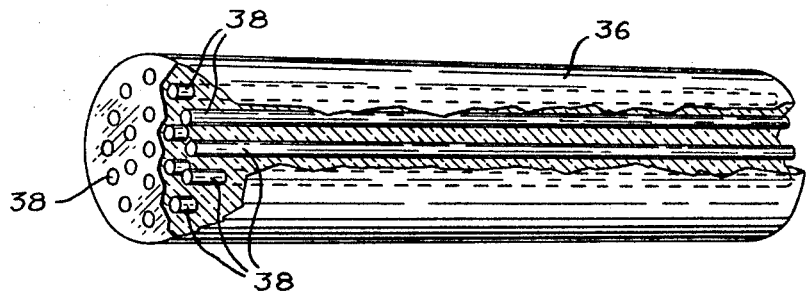
FIG. 6 is a perspective view partially in section showing a third embodiment of the laser material of this invention.

FIG. 6 shows a third embodiment of the invention. In this embodiment the laserable core indicated by 36 has formed therein sensitizer elements in the form of optical fibers 38 longitudinally disposed throughout said core. An advantage of this embodiment is that energy being transferred from the sensitizer element will be more efficiently absorbed by the laserable core than is the case with the cladding embodiment shown in FIG. 2, since the sensitizer elements are surrounded by the laserable core.

The laserable material of the present invention is intended for utilization in laser light generators. The term "generator" includes both oscillators and amplifiers. In an oscillator, rod 20 itself may be provided with reflective ends 30, 31 on core 22 (see FIG. 2) or alterantively laser rod 20 may be positioned within an optically regenerative resonant cavity. In any embodiment it is important that the ends of the sensitizer element be essentially transmissive and that any oscillations produced within the laser material be restricted to the laserable core. To restrict oscillation solely to said laserable core dichroic reflectors may be employed, said dichroics being reflective for the resulting stimulated emission of erbium ions and transmissive for the neodymium and ytterbium emission. Alternatively, the Q of the sensitizer element can be kept low by grinding the ends of the sensitizer element. The term "Q" is intended to represent the ratio of wave energy storage to wave energy dissipation per unit cycle.

I claim:

1. A laser material comprised of two differently doped glasses, the first glass being a laserable core and the second glass being a sensitizer element, wherein all laserable core contains a laserable quantity of erbium ions and a quantity of ytterbium ions sufficient to enable an energy transfer to occur between said ytterbium ions and said erbium ions, and said sensitizer element contains a quantity of neodymium ions in a concentration sufficient to enable transfer of energy to occur from said neodymium ions within said sensitizer element to said ytterbium and erbium ions within said laserable core, said sensitizer element and said laserable core being proximately disposed with respect to each other to form said laserable material.

2. The laserable material as set forth in claim 1 wherein said sensitizer element comprises a cladding encasing said laserable core.

3. The laserable material as set forth in claim 1 wherein said sensitizer element comprises a number of optical fibers formed within and longitudinally disposed within said laserable core.

4. The laserable material as set forth in claim 1 wherein said sensitizer element also includes ytterbium ions, said ytterbium ions being present in a concentration sufficient to receive energy from said neodymium ions and transfer said received energy to said ytterbium and erbium ions within said laserable core.

5. The laserable material as set forth in claim 2 wherein said cladding also includes ytterbium ions, said ytterbium ions being present in a concentration sufficient to receive energy from said neodymium ions and transfer said received energy to said ytterbium and erbium ions within said laserable core.

6. The laserable material as set forth in claim 3 wherein said optical fibers also include ytterbium ions, said yetterbium ions being present in a concentration sufficient to receive energy from said neodymium ions and transfer said received energy to said ytterbium and erbium ions within said laserable core.

References Cited

UNITED STATES PATENTS

| | | | |
|---|---|---|---|
| 3,219,585 | 11/1965 | Kaiser | 252—301.4 |
| 3,405,371 | 10/1968 | Johnson et al. | 252—301.4 |

TOBIAS E. LEVOW, Primary Examiner

R. D. EDMONDS, Assistant Examiner

U.S. Cl. X.R.

330—4.3; 331—94.5